UNITED STATES PATENT OFFICE.

CHARLES A. L. TOTTEN, OF THE UNITED STATES ARMY.

MANUFACTURE AND PROPORTIONING OF WEIGHTS AND MEASURES.

SPECIFICATION forming part of Letters Patent No. 293,117, dated February 5, 1884.

Application filed April 30, 1883. (No specimens.)

*To all whom it may concern:*

Be it known that I, CHARLES A. L. TOTTEN, of the Army of the United States, have discovered and invented a new and useful Improvement in the Mode of Making and Proportioning Weights and Measures; and I do hereby declare the following to be a full, clear, and exact description of the same.

This invention is particularly concerned in the discovery of the proper aliquot parts by means of which a system of weights and measures, similar to those known as "troy," "apothecary," "avoirdupois," "wine-measure," "dry measure," "imperial," and, in fact, all Anglo-Saxon weights and measures, may be improved, perfected, and mutually connected with each other, for the purposes of better reduction and facility in passing from one system to another. The adoption of my system will change all the values now involved and known as "grains," "drams," "ounces," "pounds," "gills," "pints," "quarts," &c., (more or less,) in such a way as to render them new amounts. The changes, however, are of very small quantities from the practical standpoint of every-day life, and while not calculated to involve inconvenience, if ever adopted, are still such as to be radical from a scientific standpoint, in that they look toward unifying, under certain new and essential formulæ, things which now are not so.

I will now describe my discovery, after which I will be able to point out more clearly how much and how little I differ from the present systems.

The basis of my system of weights and measures is a cubic inch of material, where density shall be 5.7 times that of pure water at mean earth temperature and pressure. For the purposes of correlating the various systems now in use, I have discovered that such a quantity of material—(1 inch)³ at 5.7 pure water at earth's mean temperature and barometric pressure should be subdivided into exactly 1,536 elements, which I shall denominate "grains." These elements correspond very closely with what have hitherto been termed "grains" in Anglo-Saxon and other weights and measures; but they differ from them essentially, in that they are a shade less, in the ratio of about, (in cubic inches of pure water, &c.:) my grains equal .0037109375, (exact;) present grains equal .00395735+. I furthermore propose to subdivide my "unit cube" into certain other ultimates of still less dimensions, such that there shall be exactly 2,000 thereof contained therein, and which have no counterpart in the present Anglo-Saxon measures of weight. I shall call these "ultimates," because I can conceive of no smaller denomination for purposes of weights ever being necessary as a thing of special "name." I will again emphasize the fact that in my unit cube there shall be (at mean temperature, taken for the present at 68° Fahrenheit, and pressure taken at 30" barometer) exactly 1,536 grains and 2,000 ultimates.

I will now define and fix absolutely what I mean by a "grain" and an "ultimate."

My ultimate shall exactly equal .00285 cubic inch of pure water at mean temperature (68° Fahrenheit) and 30" barometer, or be $\frac{1}{2000}$ of such a cube as I have above described.

My grain shall equal exactly $\frac{125}{96}$ of an ultimate, equal .0037109375 (exact) cubic inch of pure water at mean earth temperature and pressure.

I now declare that what I shall employ and denominate as the "unit ounce weight" shall consist of 480 of my grains or of 625 of my ultimates, or, in other words, shall equal in weight exactly 1.78125 cubic inch of pure water at mean temperature and pressure. When I say "exactly," I mean it literally. There are, for instance, no more figures after the 5 in the number (1.78125) just employed. The foregoing values being fixed and constant, I intend to rectify Anglo-Saxon weight and capacity measures thereby. For instance, my avoirdupois pound is to consist of 16 of the above unit ounces, my troy and apothecary pounds of 12 such ounces; and I intend to introduce one other system of weights, which I shall designate as "standard weight," in which the pound shall be 10 such ounces. These various weight-measures, as rectified by the above constants, will therefore stand as follows, in which it will be noticed that while I preserve, as I of course intended in rectifying the system, the terms now in use, I have necessarily altered all their values, and added the ultimate as a still lower subdivision. Since I claim this as an entirely new system, it must be constantly borne in mind that as my ultimate, grain, and ounce are different by a shade from the present grain and ounce, my whole scheme of weights and the capacity measures, hereinafter to be shown as resulting from them, must correspondingly vary, and must therefore be new, whatever may be its essential value for future use among men.

Now, my tables are as follows:

Troy Weight.

24 grains—1 pennyweight=31¼ ultimates.
20 dwt.—1 ounce=480 grains=625 ults.
12 oz.—1 pound=240 dwt.=5,760 grs.=7,500 ults.

Upon its surface the above table, save in the use of the additional ultimate, does not appear to differ from troy weight as given in any book of tables. This is because I preserve all the terms and the form of the old system. This is one of the chief merits in the value of my discovery, that, while by my system the weights now in use become absolutely perfected, no confusion can result in their adoption.

Apothecary Weight.

20 grains—1 scruple=26 1/24 ults.
3 scruples—1 dram=60 grs.=78⅛ ults.
8 drams—1 ounce=24 scruples=480 grs.=625 ults.
12 ounces—1 pound=96 drs.=288 scru.=5,760 grs.=7,500 ults.

Similar remarks are in order relative to the above table.

Avoirdupois Weight.

30 grains—1 dram=39 1/16 ults.
16 drams—1 ounce=480 grs.=625 ults.
16 ounces—1 pound=256 drs.=7,680 grs.=10,000 ults.
28 pounds—1 quarter=448 oz.=7,168 drs.=215,040 grs.=280,000 ults.
4 quarters—1 cwt.=112 lbs.=1,792 oz.=28,672 drs.=860,160 grs.=1,120,000 ults.
20 cwt.—1 ton=80 qrs.=2,240 lbs.=35,840 oz.=573,440 drs.=17,203,200 grs.=22,400,000 ults.

In the avoirdupois table the present form and skeleton is preserved, save that the effect of my discovery is to rectify the form in one particular—namely, 30 of my grains equal 1 dram, while in the present statute tables 27.34375 of the old Anglo-Saxon grains go to form the dram. My system thus clears the most important or commercial weight of its awkward fractional commencement, besides making its ounce, grain, and ultimate of the constant or unit value of all the other tables.

Standard Weight.

10 standard grains—1 standard scruple=13 1/24 ults.
4 standard scruples—1 standard dram=40 grs.=52⅛ ults.
12 standard drams—1 standard ounce=48 scr.=480 grs.=625 ults.
10 standard ounces—1 standard pound=120 drs.=480 scr.=4,800 grs.=6,250 ults.
(4 pounds—1 quart. wt.)=480 drs.
(2½ qt. wt.—1 stone)=10 lbs.=&c.
10 standard pounds—1 standard stone=100 oz.=1,200 drs.
(4 stone—1 sack wt.)=40 lbs.=400 oz.=4,800 drs.
(2½ sk. wt.—1 quintal)=100 lbs.=&c.
10 standard stone—1 standard quintal=100 lbs.=1,000 oz.=12,000 drs.
(4 quint.—1 wey)=40 st.=400 lbs.=4,000 oz.=48,000 drs.
(2½ weys—1 thous. wt.)=100 stone=&c.
10 standard quint.—1 standard thous. wt.=100 stone=1,000 lbs.=10,000 oz.=120,000 drs.
(4 thous. wts.—1 ton)=40 quint.=400 stone=4,000 lbs.=40,000 oz.=&c.
(2½ tons—1 bin)=10 thous. wt.=100 quint.=&c.
10 standard thous. wts.—1 standard bin=100 quint.=1,000 stone=10,000 lbs.=100,000 ozs.=&c.
4 bins—1 standard=10 tons=40 thous. wts.=100 weys=&c.

In the above table, which is a new one, but in which, for facility of introduction, old and well-known Anglo-Saxon terms are employed, the most noticeable feature is its decimal system. Commencing at the unit ounce, it may be read decimally as follows:

| | | |
|---|---|---|
| 10 ounces | make | one pound. |
| 10 pounds | " | " stone. |
| 10 stone | " | " quintal. |
| 10 quintals | " | " thousand weight. |
| 10 thous. wts. | " | " bin. |
| 4 bins | " | " standard. |

But it is doubly decimal, since there is an alternate system running through it, as follows:

| | | |
|---|---|---|
| 4 pounds | make one | quart. weight. |
| 10 quart. wts. | " | " sack weight. |
| 10 sack wts. | " | " wey. |
| 10 weys | " | " ton. |
| 10 tons | " | " standard. |

Moreover, a careful study of the table will show the facility with which any and all of its various terms may be halved, quartered, and multifariously subdivided into common fractional parts. Thus, 1 pound equals ¼ of a quart; 5 ounces equal ½ a pound; ¼ of a sack equals 1 stone, &c. The completeness with which this common fractional subdivision, so necessary in the daily use even of a decimal system, may be effected will be best understood from the following: Since there are 4,800 grains in a standard pound, and since $4,800 = 2 \times 2 \times 2 \times 2 \times 2 \times 2 \times 5 \times 5 \times 3 \times 1$, it follows that the pound may be divided into $\frac{1}{2}$'s, $\frac{1}{3}$'s, $\frac{1}{4}$'s, $\frac{1}{5}$'s, $\frac{1}{6}$'s, $\frac{1}{8}$'s, $\frac{1}{10}$'s, $\frac{1}{12}$'s, $\frac{1}{15}$'s, $\frac{1}{16}$'s, $\frac{1}{20}$'s, $\frac{1}{24}$'s, $\frac{1}{25}$'s, $\frac{1}{30}$'s, $\frac{1}{32}$'s, $\frac{1}{40}$'s, $\frac{1}{48}$'s, $\frac{1}{50}$'s, $\frac{1}{60}$'s, $\frac{1}{64}$'s, $\frac{1}{75}$'s, $\frac{1}{80}$'s, $\frac{1}{96}$'s, $\frac{1}{100}$'s, $\frac{1}{120}$'s, $\frac{1}{240}$'s, &c., and hence that every term in the table may likewise be so subdivided without fractional remainders, &c.; hence, if a decimal table of weights and measures be actually necessary at the present state of science and commerce, we have one in the system now discovered whose introduction will involve no change of terms in Anglo-Saxondom, whose unit (the ounce) is that of troy, apothecary, and avoirdupois weights, and one, too, in which the decimal system is not only double, but which offers extraordinary facilities for the still more necessary employment of common fractions, &c.

From the foregoing tables the following facts result:

I. Since in my system the ultimate and grain are each perfect aliquots of a cubic inch of my standard material, (5.7 water,)—to wit, $\frac{1}{2000}$ and $\frac{1}{1536}$, respectively—and since all of my subdivisions throughout the tables, as rectified, contain whole numbers of grains, it necessarily follows that there are no subdivisions in the entire series of tables which are not likewise exact aliquots or multiples of such a cubic inch—i. e., there are none of whose cubic contents in exact mathematical terms we may not say it shall and does contain so or so many cubic inches. Take, for example, any one, as a dram apothecary; then by my system it must contain $\frac{60}{1536}$ of such a cubic inch as I have defined, and any irregular number of drams—as, for instance, 7⅔ will contain $(7\frac{2}{3}) \frac{60}{1536} = \frac{23}{3} \cdot \frac{60}{1536} = \frac{460}{1536}$ parts of such a cubic inch.

II. For similar reasons every subdivision in my series of tables is exactly expressible in terms of a cubic inch of pure water at mean temperature and pressure. For as an ultimate equals .00285 (exact) cubic inch of water, and as a grain equals $\frac{125}{96}$ ultimates, it follows that any chosen subdivision, as a dram apothecary, will contain or balance $.00285 \times \frac{125}{96} \times 60$ exact parts of a cubic inch of water at mean temperature and pressure. Performing the above-indicated multiplications, the fact results that one dram apothecary (by my system) must contain $a = \frac{534375}{2400000}$ of a cubic inch of water, &c.; and $7\frac{2}{3}$ such drams, equal $\frac{23}{3}$ drams, will contain $\frac{23}{3}a = \frac{11290625}{7200000}$ of a cubic inch of water at mean temperature and pressure. Now, it is true that the above quantities are large fractions; but they are finite and exact. This is their advantage for scientific purposes, and I declare that no possible question of the above nature can be asked of my system which the tables will not answer without error in a finite form, while I know that the present Anglo-Saxon system—(i. e., as per statute to-day)—and that the metric system of France, or any other system now known, cannot and do not dream of attempting such a gigantic problem.

III. As a remarkable sequence of the above facts, the following one results, to wit: That since water is taken as the unity material of all specific gravity, and since a cubic inch of it is expressible by my system in a determinate number of aliquot parts (i. e., 5.7 cubic inches water at mean temperature and pressure equal 1,536 grains weight,) and since any and all of the Anglo-Saxon subdivisions thence come out without error in parts of such a cubic inch, hence, and to that degree of accuracy with which science can, has, or shall determine the specific gravity of any substance whatever in terms of water, then to that same degree of accuracy, no more and no less, will my tables and moduli say what is and what must be the value of a cubic inch of such material in grains and ultimates. Thus, let $x$ equal specific gravity of any substance whatever; then, a cubic inch of 5.7 material weighing 1,536 grains, it follows that $(1,536 \div 5.7) \times x$ equals the number of grains in a cubic inch of the new substance $x$—i. e., there are $(\frac{15360}{57})x$ grains in such a cubic inch. Take iron, for instance, with a specific gravity of 7.125; then in a cubic inch thereof there are $(\frac{15360}{57}) 7.125$ grains. Expressed decimally the number $(\frac{15360}{57})$ is a repetend, and equals $269.473684210526315789473 68 + \&c.$ ; hence though finite in either form it is of course more simple in the common form. Similar remarks are in order relative to the value of cubic inches of all materials in terms of the ultimate. Thus $(\frac{20000}{57})x$ equals number of ultimates in a cubic inch of a material whose specific gravity is $x$ at mean temperature and pressure. The common fraction $(\frac{20000}{57})$ is also, when expressed decimally, a repetend, to wit: equals $350.877192982456140350 + \&c.$ Such possibilities as are here enjoyed are not possessed by any other system of weights and measures upon the earth.

Having now established my unit cube, $[(1'')^3$ of 5.7 density of water at Fahrenheit 68°, barometer 30",] and defined its aliquot parts in ultimates and grains, and also what my unit ounce shall be, it is manifest that my unit cube will contain $\frac{1536}{480}$ ounces, or $3\frac{1}{5}$ ounces. I am now ready to explain my standard cube for heavy weights. It will be noticed that in my system of weights the one which I denominate "standard weight" ends with a term called a "standard." It is from this fact that I derive its name. Now, since this weight contains 400,000 ounces, each of which contains 480 grains, it follows that it will contain 192,000,000 grains; and since each of my unit cubes contains 1,536 grains, this standard will contain $192,000,000 \div 1,536 = 125,000$ such unit cubes, each of which is of 5.7 density of water at mean temperature and pressure; but the number 125,000 is itself a perfect cube—i. e., it equals $50 \times 50 \times 50$; hence the grand standard weight with which my system of rectified Anglo-Saxon weights culminates is a cube of 50 inches on an edge of that material whose specific gravity or density shall be 5.7 times water at mean temperature and pressure. By means of this cube I intend to extend my system upward, so as to comprehend the most extravagant demands that can be made upon it by a world at peace and engaged in universal intercourse and international commerce. A scheme for such extended use is given below, and since a standard equals ten tons, an average car-load, we have—

| | | |
|---|---|---|
| 10 tons | $\begin{cases} 2\frac{1}{2} \text{ tons} = 1 \text{ bin} \\ 4 \text{ bins} = 1 \text{ standard} \end{cases}$ | = 1 standard or car-load. |
| 10 car-loads | $\begin{cases} 2\frac{1}{2} \text{ car-loads} = 1 \text{ lighter} \\ 4 \text{ lighters} = 1 \text{ barge} \end{cases}$ | = 1 barge. |
| 10 barges | $\begin{cases} 2\frac{1}{2} \text{ barges} = 1 \text{ ship-load} \\ 4 \text{ ship-lds.} = 1 \text{ elevator} \end{cases}$ | = 1 elevator. |
| 10 elevators | $\begin{cases} 2\frac{1}{2} \text{ elevators} = 1 \text{ wharf} \\ 4 \text{ wharves} = 1 \text{ district} \end{cases}$ | = 1 district. |
| 10 districts | $\begin{cases} 2\frac{1}{2} \text{ districts} = 1 \text{ section} \\ 4 \text{ sections} = 1 \text{ ark} \end{cases}$ | = 1 ark or harbor. |

In the above table there runs the following subordinate decimal system:

$2\frac{1}{2}$ tons make 1 bin.
  10 bins make 1 lighter.
  10 lighters make 1 ship-load.
  10 ship-loads make 1 wharf.
  10 wharves make 1 section.
  4 sections make 1 ark or harbor.

Now, it has been already shown how from the standard cube I descend (unifying as I go the grandest system of weights—the Anglo-Saxon—that the world now possesses) to the very ultimates of troy, apothecary, avoirdupois, and standard weights. Let me, however, add, before dropping this explanation, that it is evident, that though I consider the ultimate=(.00285 exact cubic inch pure water at mean temperature and pressure) a small enough subdivision to denominate here by a special name, nevertheless, shall science find it necessary to decimate the ultimate, or grain, or the ounce, it can do so to the very limit of numerical capacity by simply removing the decimal point one place farther to the left at every division by 10. In this case, if a name be necessary, I should denominate (following our now well-known monetary phraseology of dimes, cents, and mills) $.000285 = \frac{1}{10}$ of an ultimate a "dimultimate," $.0000285 = \frac{1}{100}$ of an ultimate a "centultimate," and $.00000285 = \frac{1}{1000}$ of an ultimate a "milleultimate," &c. In a similar way we can have dimegrains, centigrains, and millegrains and dimeounces, centiounces, and milleounces, &c.

One can hardly imagine even that the remotest science will ever be able to appreciate so small a quantity as a millionth of an ultimate. Nevertheless, as mathematics may write and employ in calculation a millionth even of a millionth (.000000000001) of an ultimate, (.00285,) this system admits of it in an exact number $= .00000000000000285$, since the figure 5 in 285 is always final.

For making standard weights of comparison in each of the several branches of the system as rectified, I can of course employ any suitable material as heretofore; but I intend to employ particularly, and for several special purposes, certain specified substances now to be noted, and which I have discovered are pre-eminently suited for the purpose, to wit: I shall probably employ an alloy so proportioned as to have a specific gravity of 5.7 water, &c. It is the density 5.7 that I care for more than for any particular kind of metal or alloy; hence I shall simply call it an alloy or substance whose specific gravity shall be 5.7 water. This substance I intend to use for the manufacture of "weights of comparison" particularly. As an example, I will note that an alloy of copper and aluminum will be the probable basis of this class of weights. It may here be noted that: $\frac{1}{2}$[1 part copper (specific gravity $8.8 \pm$) $+$ 1 part aluminum (specific gravity $2.6 \mp$)] $= \frac{1}{2}(8.8(\pm) + 2.6(\mp)) = 5.7$. This alloy will afford me a very beautiful and durable standard material. Zinc, $\frac{1}{2}$, and copper, 1, would also form a good basis. The ordinary pure lead, specific gravity 11.4, equal to $(5.7) \times 2$, will also afford me a good pure metal to work upon for more compact weights. Thus lead hardened with zinc and antimony, and then again alloyed with a heavier metal to bring it back to specific gravity 2, (5.7,) will give me nature's own substance for ordinary and hasty weights of commerce. Iron, however, fits my system very beautifully as a substance out of which to manufacture weights suitable to my scheme of subdivision, and for this reason: Since my standard cube of 125,000 cubic inches of 5.7 density material will exactly balance an amount of water (pure and at mean temperature and pressure) equal to 125,000 cubic inches $\times 5.7 = 7,125,000$ cubic inches water, and since I can easily obtain an iron whose specific gravity is exactly 7.125 pure water, &c., it follows that 7,125,000 cubic inches $\div 7.125 = 100,000$ cubic inches of such iron will exactly balance my standard cube. Now, my tables show that a standard cube actually weighs 25,000 rectified avoirdupois pounds; hence 100,000 cubic inches iron equal 25,000 rectified avoirdupois pounds. Therefore, 4 cubic inches iron at 7.125 specific gravity equal 1 pound avoirdupois rectified, and 1 cubic inch equals 4 ounces, and $\frac{1}{4}$ cubic inch equals 1 ounce, &c.; and since my unit ounce is common to all the branches of the system, it likewise follows that 3 cubic inches iron at 7.125 water equal 1 pound troy and apothecary rectified, 4 cubic inches equal 1 pound avoirdupois rectified, and $2\frac{1}{2}$ cubic inches equal 1 pound standard rectified.

The beauty with which my system not only rectifies the Anglo-Saxon weights, but draws upon nature herself to furnish man with standard weights of comparison, (5.7 material,) hasty weights, (lead, 11.4,) and commercial weights, (7.125 material,) &c., is just as apparent as the idea is new. The fact is, weight, capacity, and dimension are laws of nature—(man cannot originate an arbitrary one, as the French have attempted to do in their metric system, and have it survive the test of practical experience)—and I verily believe that I have discovered those fundamental principles, moduli, units, and specific gravities by means of which these things harmoniously exist.

So much for the weight-measures of my system. It will be noticed that with the unit-ounce weight we can form pounds of any desired size—e. g., 20-ounce pounds, $16\frac{1}{2}$-ounce pounds, $18\frac{3}{4}$-ounce pounds, &c.—and rectify thereby and by the grain and ultimate all Anglo-Saxon weights whatsoever.

I will now turn to capacity-measures, which are intimately connected with those of weight.

Since an ounce weight of pure water at mean temperature and pressure equal 1.78125 cubic inch was the unit by means of which I have already shown Anglo-Saxon weight-measures may be unified, so I have also discovered that its cubic space (i. e., that occupied by one of my rectified ounces of water equal 1.78125 cubic inches, exact) shall and must be the unit ounce of capacity. For example, a United States liquid-measure pint equals 4 gills, but a gill equals 4 ounces; therefore a pint equals 16 ounces, or at the capacity of my unit of capacity equals $1.78125 \times 4 = 28.5$ (exact) cubic inches—that is, it is $28\frac{1}{2}$ cubic inches, neither more nor less, and therefore it has the same capacity of 10,000 ultimates or of 7,680 grains, as already fixed in my foregoing discussion. The unit being as above, I will now show the Anglo-Saxon capacity-measures, both liquid and dry, under its unifying influence.

*United States Liquid Measure Rectified.*

| | | | |
|---|---|---|---|
| 4 oz.=1 gill | =7.125 | (exact) cu. in. | |
| 4 gills=1 pint | 28.5 | " " | |
| 2 pints=1 quart | 57. | " " | |
| 4 quarts=1 gallon | 228. | " " | |
| $62\frac{1}{2}$ gallons=1 hogshead | 14,250. | " " | |
| 2 hogsheads=1 pipe or butt | 28,500. | " " | =1,000 pts. |
| 2 pipes=1 tun | 57,000. | " " | =1,000 qts. |

I believe that the hogshead should be $62\frac{1}{2}$ gallons instead of 63, as by present statute. The cubic capacity of a hogshead would then equal 14,250 cubic inches, that of a pipe 28,500 cubic inches, and of a tun equal 57,000 cubic inches, and the beauty of the decimal sequence be very apparent, as well as the utility to be derived from the cubic capacities 7.125, 57 and their multiples. It will be noticed that these are the specific-gravity numbers of iron and of my standard material; hence a cubic inch of iron at 7.125 placed upon a scale or balance opposite any empty capacity-measure whatsoever, and the latter filled with pure water at mean temperature and pressure until they balance, the water-line marks off 1 gill. So, 10 cubic inches of 5.7 material, balanced by water under standard circumstances, will show by the surface water-line in any capacity-measure its quart-mark, &c.

*United States Dry Measure Rectified.*

[The basis of the present measure (by United States statutes) is the "old Winchester struck bushel of 2,150.42 cubic inches." Now, I claim that this is an error, and that the true basis of the "old" struck bushel was 250 gills struck to 300—i. e., 7.125 cubic inches × 300=2,137.5 (exact) cubic inches. At this latter quantity I shall take it, since I am working upon and after truth and unification, and so long as this table of capacity-measure shall be deemed desirable I claim and shall maintain that it is the true basis. Taking it at this value, it will be seen to have the capacity of 100 pounds troy (rectified) of pure water. The above being premised, I will now give what is the correct table, merely calling attention to the fact that like as the rectified liquid-measure pint corresponds in capacity to a 16-ounce weight of water—i. e., to a rectified avoirdupois pound—so the capacity of a rectified pint of United States dry measure corresponds to a pound made up of 18¾ ounces.]

TABLE.

|  |  |  | Cu. In. |
|---|---|---|---|
| 1 pint | = |  U. S. D. M. | 33.3984375 (exact.) |
| 2 pints | = 1 quart | " | 66.796875 " |
| 4 quarts | = 1 gallon | " | 267.1875 " |
| 2 gallons | = 1 peck | " | 534.375 " |
| 4 pecks | = 1 struck bushel | " | 2137.5 " |

*The British Imperial Measure, (both Liquid and Dry.)*

[Trautwine says the "basis is ten pounds avoirdupois of pure water at 62° Fahrenheit and 30" barometer." Hence as 1 pound avoirdupois equals 28.5=1.78125×16, the true basis upon the rectified system is 285 cubic inches of pure water at 68° Fahrenheit and 30" barometer, or ten pounds equal 1 gallon. Hence the measures will stand as follows:]

TABLE.

|  |  | Avoir. lbs. | Cu. In. |  |
|---|---|---|---|---|
| 1 gill | = |  | .3125 | 8.90625 |
| 4 gills | = 1 pint | 1.25 | 35.625 | = 8 gills. |
| 2 pints | = 1 quart | 2.5 | 71.25 | = 4 pints = 16 gills. |
| 2 quarts | = 1 pottle | 5. | 142.5 | = 4 quarts = 8 pints = 32 gills. |
| 2 pottles | = 1 gallon | 10. | 285.0 | = 4 pottles = 8 quarts = 16 pints = 64 gills. |
| 2 gallons | = 1 peck | 20. | 570. |  |
| 4 pecks | = 1 bushel | 80. | 2280. | = 8 gallons. |
| 4 bushels | = 1 coomb | 320. | 9120. | = 32 gallons = 16 pecks. |
| 2 coombs | = 1 quarter | 640. | 18240. | = 64 gallons = 32 pecks = 8 bushels. |

(Dry Measure)

To the above systems I intend to add a new table, similar in its terms and subdivisions to that denominated "standard weight," and which I shall probably call "standard capacity-measure." It is needless, therefore, to repeat it here, for I intend to employ the same unit ounce of measure or capacity, (to wit, 1.78125 cubic inch,) &c., that I have already established as the constant unit of rectified Anglo-Saxon measures.

Having now described my discovery, I will briefly reiterate that the principle I have developed, and upon which I work, is as follows: I shall take a cube of 50 linear units on an edge, and fill it with a material whose mean density is 5.7 at mean temperature and pressure. Then, since it contains 125,000 cubic units (inches) of such material, it must balance 712,500 cubic inches (units) of pure water under similar circumstances, and I declare that such a weight shall consist of 192,000,000 grains, or 250,000,000 ultimates. Now, if the linear unit shall vary so as to make our present authorized inch, either + or − to any small degree, it shall not alter the arithmetical fact that I will still use 50 of such new units as the edge of my standard cube. I shall maintain that specific gravity 5.7 is the proper standard density in terms of pure water at whatever may be mean temperature and pressure of the earth, (I now believe them to be 68° Fahrenheit and 30" barometer,) and I shall have the same number of grains and ultimates in the standard and unit cubes as I have above set forth. I will also say that it is manifest that to use any multiple of my discovered moduli is to encroach upon my formulæ. Having thus fixed my standard cube, and taken as my unit cube one of 1,536 such grains, or 1—125,000 of the standard, I then establish the fact that as my ultimate will occupy .00285 cubic inch of pure water at standard temperature and pressure, and as my ounce shall contain 625 ultimates, therefore my unit-ounce weight shall balance 1.78125 cubic inch of pure water at standard temperature and pressure, or .3125 cubic inch of 5.7 material under same circumstances; and by this unit-ounce weight I intend to rectify all Anglo-Saxon weights whatsoever. I also declare that the space occupied by this unit-ounce weight, when in pure water at standard conditions—to wit, 1.78125 cubic inch—shall be, and is, the unit ounce of measure or capacity.

By and with these weights and capacities, and their multiples, ranging upward and downward over the whole field of weight and capacity, and which values I believe myself to have first discovered, I intend to rectify present measures, and to use the same in manufacture of weights and measures. I claim, therefore, the undoubted and sole right. Should, however, a standard density of more or less than 5.7 (exact) be desirable—as, for instance, one of $\frac{180}{100} = \frac{180}{31.415+} = 5.729 \pm$ &c.—then the relations of the system to the standard cube of 50" on an edge will result in proportional figures. Thus, $125,000 \times \frac{180}{100}$ will equal $716,187.\pm$ cubic inches of pure water at standard circumstances, and all the figures throughout would correspondingly vary. For obvious reasons, however, I am of the opinion that the standard density 5.7, without further fractional termination, and because of its simple relation to the cubic volume 712,500 through the cube of $50'' = 125,000$, is the proper one to employ. The new principles upon which I have based the present system cover, however, a density of $\frac{180}{10^n}$, as well as of 5.7 exact, whether I desire to employ it or not, and this is because I have been the first one to found a system of metrology upon a standard density such that it shall have particular relations to, first, geometric volumes—for instance, cubes $(50'')^3$, &c.; second, specific gravities, (5.7, &c.=standard; 11.4=lead; 7.125=iron, &c.)

What I therefore claim as new, and desire to secure by Letters Patent, is—

1. Weights, for use upon scales, balances, &c., based upon the aliquot subdivision of a cubic inch of 5.7 density material, at mean temperature and pressure, into 1,536 grains and 2,000 ultimates, as and for the purposes specified.

2. Weights for similar use based upon suitable multiples of my standard density—to wit, 5.7 specific gravity—as and for the purposes specified.

3. Weights, for similar use, made of an iron or other substance whose density shall be 7.125 water, at mean temperature and pressure, or suitable multiples thereof, as and for the purposes specified.

4. Measures of capacity, liquid and dry, based upon the fact that the standard ounce or unit of capacity-measure shall have the same volume or occupy the same space (to wit, 1.78125 cubic inch) as is occupied by a unit-ounce weight, expressed in pure water under standard circumstances, as above described.

5. The combined system of weights and capacity-measures, unified as above by my formulæ and moduli, and with or without reference to any particular standard temperature and pressure, as and for the purposes specified.

6. Cubes (standard, unit, &c.) of material 5.7 times the density of water, at mean or standard circumstances, marked, stamped, or otherwise designated to show their value in aliquot parts, and their several relations to the foregoing system, as and for the purposes specified.

7. Cubes and other geometrical solids suitable for reference, and of specific materials, metals, alloys, &c., duly stamped, engraved, or otherwise marked, so as to show their relations to the foregoing rectified system of measures, for use as standards of reference, &c., as and for the purposes specified.

C. A. L. TOTTEN.

Witnesses:
  H. A. SPRINGETT,
  A. B. DYER.